United States Patent Office 2,838,158
Patented June 10, 1958

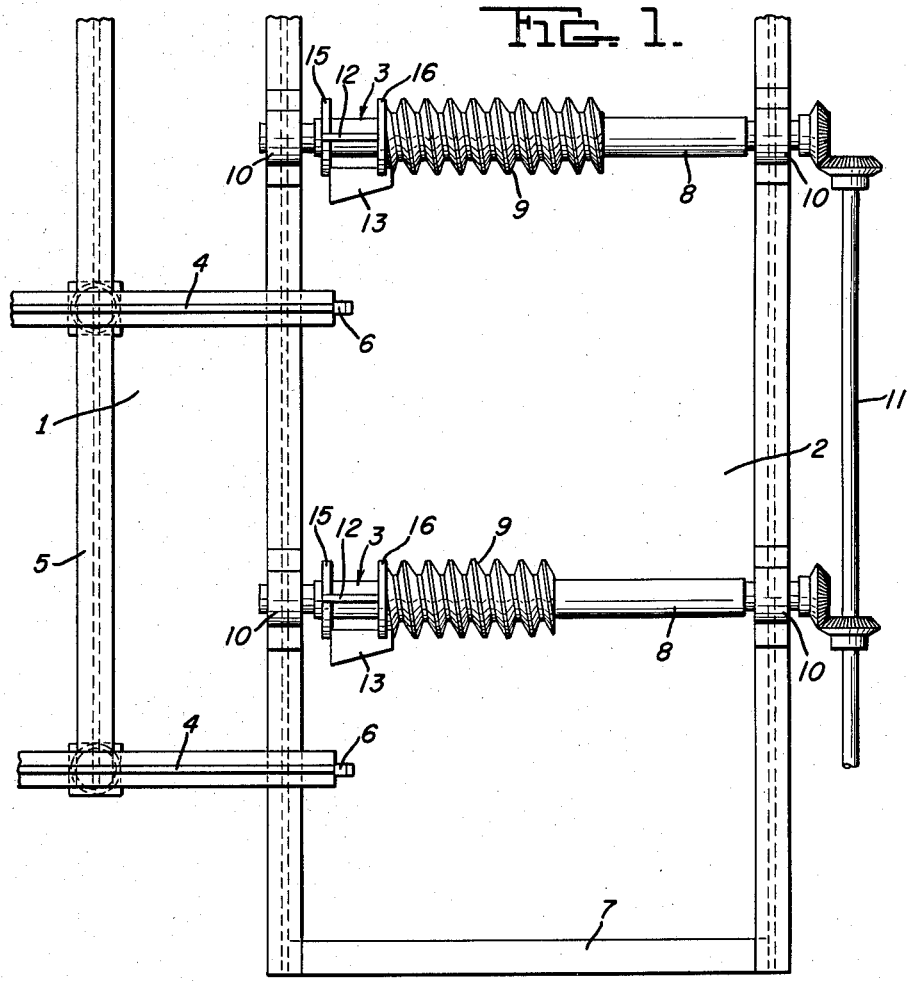
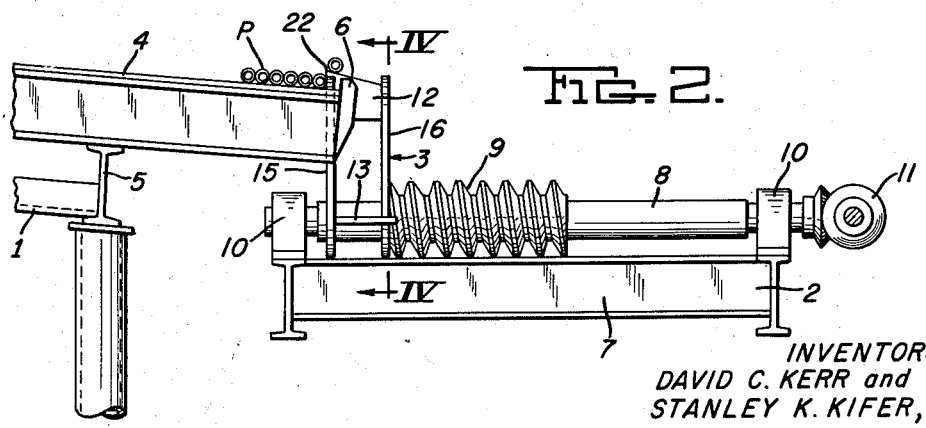

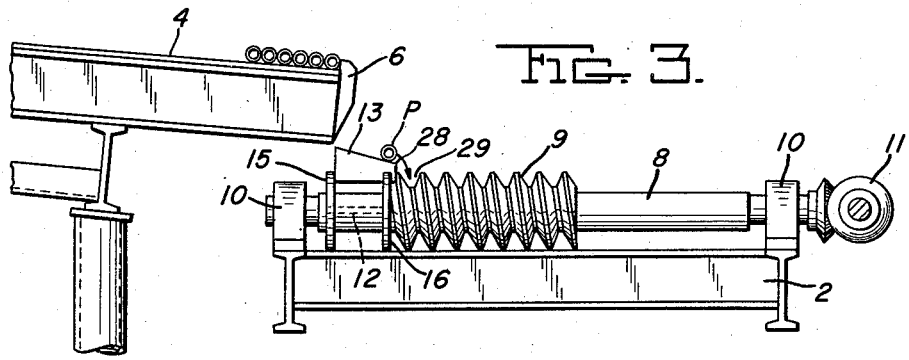
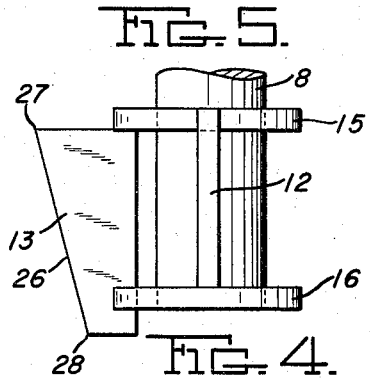
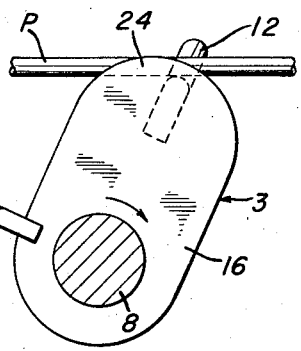
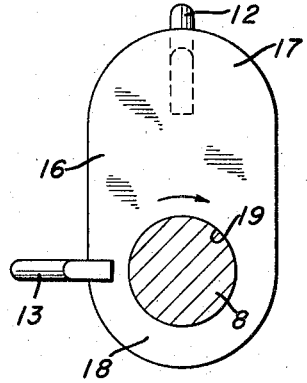
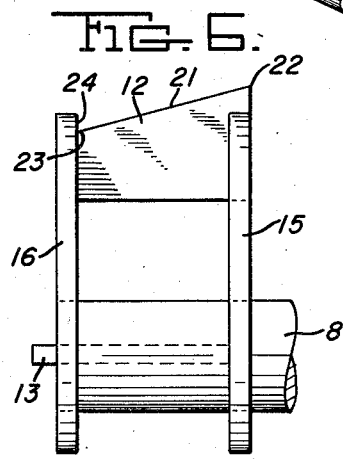
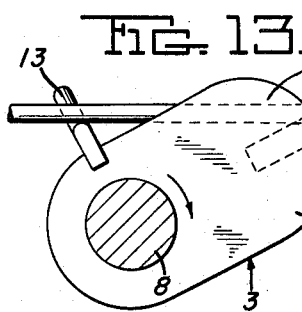
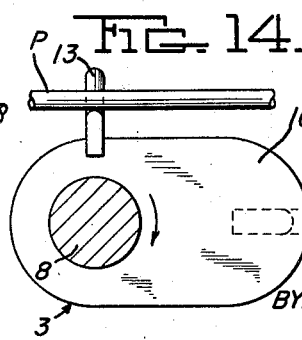

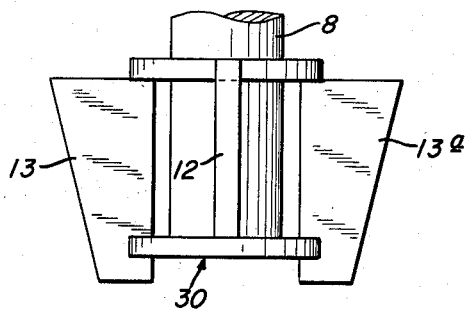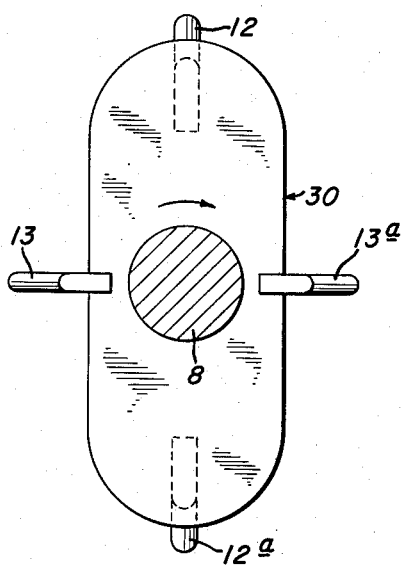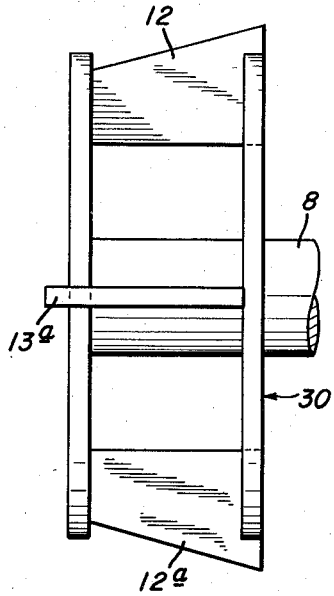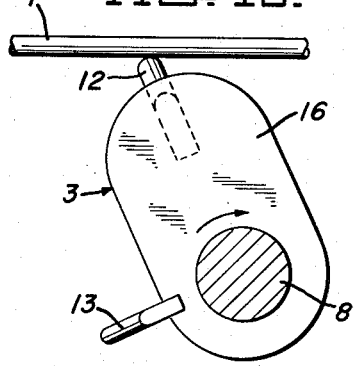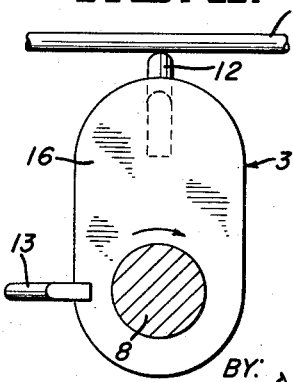

2,838,158

PIPE HANDLING APPARATUS

David C. Kerr and Stanley K. Kifer, Lorain, Ohio, assignors to United States Steel Corporation, a corporation of New Jersey Application February 23, 1955, Serial No. 490,095

5 Claims. (Cl. 198—26)

This invention relates to a pipe handling apparatus for transferring pipe between spaced parallel tables on which lengths of pipe are received in parallel positions and, more particularly, for transferring the pipe between tables at different vertical elevations.

The pipe transfer mechanism of this invention has been specifically designed for a pipe galvanizing apparatus of the type shown in Patent No. 2,326,844 issued August 17, 1943 to Paul C. Ely. In the apparatus shown in this patent, pipe is fed to and from a galvanizing tank by ingoing and outgoing screw conveyor tables respectively having a plurality of transversely extending threaded rolls which form a driving support for the pipe thereon. The threads in the various rolls are aligned lengthwise of the feed tables in such manner that a pipe deposited in aligned threads at one edge of the table will be moved laterally and longitudinally as explained in greater detail in the patent. The ingoing table receives the pipe from a delivery conveyor and the pipe is removed from the outgoing table to a receiving conveyor, the delivery and receiving conveyors being tables having skids over which the pipe is moved laterally. Since the ingoing and outgoing screw conveyor tables are inclined in a lengthwise direction relative to the galvanizing tank, they are at different vertical levels with respect to the delivery and receiving conveyor tables. This difference in elevation introduces a difficult problem with respect to effecting emplacement of the pipe on and its removal from the screw conveyor tables in an orderly fashion and without jar or impact.

One of the principal objects of this invention is to provide an apparatus for transferring pipe between a pair of laterally spaced and parallel tables at different vertical elevations which will change the vertical elevation of and continuously support the pipe during its transfer from one table to the other.

Another object of the invention is to provide an apparatus for moving pipe vertically and laterally with respect to a supporting table formed of a plurality of parallel screw conveyor rolls and which will deposit the pipe on the edge of such table in a position normal to the axes of the conveyor rolls and received in aligned threaded portions thereof.

A further object of the invention is to provide an apparatus for transferring pipe between laterally spaced and parallel tables at different vertical elevations comprised of a pair of skids which are rotated synchronously about parallel axes extending transversely between the tables and which are operable during rotation thereof to lift a pipe from one of the tables so that it may gravitate down the skids toward the other of the tables, the skids in this manner providing a rotating support for changing the elevation of the pipe during its gravitational movement toward the other of the tables.

A still further object of the invention is to provide a set of rotating skids of the character referred to with stops for arresting the gravitational movement of the pipe thereover so that continued rotation of the skids is effective to move the pipe to the desired vertical level at which it may be transferred to the other table.

A still further object of the invention is to provide a transfer mechanism having a set of rotating skids of the character referred to with a second set of skids to which the pipe is transferred after having its elevation changed to a predetermined level relative to the table to which it is being moved, the second set of skids having provisions for continuing the lateral gravitational movement of the pipe and for depositing it on the last named table.

Other objects and advantages of the invention will become apparent from the following description.

In the drawings there is shown a preferred embodiment of the invention. In this showing:

Figure 1 is a fragmentary plan view of a pair of tables between which pipe is to be transferred and which are provided with a pipe transfer apparatus constructed in accordance with the principles of this invention;

Figure 2 is an end view of the apparatus shown in Figure 1 illustrating the position of one of the transfer units of this invention in which it is operating to remove a pipe from one of the tables;

Figure 3 is a view similar to Figure 2 showing the position of the transfer unit in which it operates to deposit the pipe on the other of the tables;

Figure 4 is an enlarged detailed end and sectional view of one of the transfer units taken in the plane of the line IV—IV of Figure 2;

Figure 5 is a plan view of the unit shown in Figure 4;

Figure 6 is a side elevation looking from the right of Figure 4;

Figures 7, 8 and 9 are views respectively similar to Figures 4, 5 and 6 illustrating a modified form of transfer unit; and Figures 10 through 14 furnish a kinematic illustration of the consecutive positions of one of the transfer units during its rotation to transfer a pipe from one table to another.

In the drawings, a pair of tables 1 and 2 are shown in laterally spaced relation and at different elevations with respect to each other. The table 2, for example, may be an ingoing table for delivering pipe to a galvanizing tank in the manner described in the above mentioned patent and the table 1 is a feed table for holding a supply of pipe to be transferred to the ingoing table 2. A pair of pipe transfer units 3 constructed in accordance with the principles of this invention are mounted at spaced points longitudinally of the tables 1 and 2 and in the space between adjacent edges thereof. The lengths of pipe are supported on the tables 1 and 2 in positions parallel to such tables and to each other and, in a manner to be described, the transfer units 3 operate to transfer the pipe over the space therebetween. In transferring the pipe, the units 3 furnish a continuous support for the pipe while changing its elevation in accordance with the requirements of the tables 1 and 2.

The feed table 1 has a plurality of transversely extending skids 4 mounted on a longitudinally extending supporting beam 5. The skids 4 slope downwardly as best shown in Figures 2 and 3 and provide an inclined surface down which lengths of pipe P gravitate to the lower edge thereof. Stops 6 are secured to the lower ends of the skids 4 and project above their inclined supporting surfaces for arresting the gravitational movement of the pipe at the lower edge of the table 1.

The table 2 has a framework 7 on which shafts 8 mounting feed rolls 9 are supported by bearings 10. The feed rolls 9 are threaded so that rotation thereof is effective to impart a lateral and longitudinal movement to pipe received thereon as explained in the above mentioned patent. The outer ends of the shafts are connected with a gear drive 11 for effecting synchronous rotation thereof. In order to effect proper feeding action of the lengths of pipe P and with such lengths supported in parallel positions on the table 2, it is essential that the pipe be deposited in aligned sets of threads on the rolls 9 at the inner edge of the table 2.

The transfer units 3 are secured to the feed roll shafts 8 for rotation therewith about parallel axes extending transversely of the space between the tables 1 and 2. As best shown in Figures 4, 5 and 6, each of the units 3 has a pair of pipe transfer skids 12 and 13 which extend transversely of the space between adjacent edges of the tables 1 and 2 and are mounted at different radial distances with respect to the axis of rotation of the shaft 8 on which it is mounted. More specifically, the skids 12 and 13 are mounted on end plates 15 and 16 which are secured to the shaft 8 in axially spaced positions. The plates 15 and 16 are elongated and rounded at their ends 17 and 18, the ends 18 having openings 19 through which a shaft 8 projects. The skid 12 is secured to the end 17 and the skid 13 to the end 18 in such manner that the skids 12 and 13 are displaced an angle of 90° relative to each other. The shape of the end plates 15 and 16 together with the radial displacement of the skids 12 and 13 provides for transfer of the pipe P to the skid 13 for movement onto the table 2 in a manner to be described.

The skid 12 is a radially extending plate having a pipe supporting surface 21 which converges with respect to the shaft 8 from its end 22 to its end 23. The end 22 projects radially beyond the outer edge of the plate 15 and the end 23 is positioned radially inwardly of the end portion 24 of the plate 16 so that the portion 24 provides a stop for arresting gravitational movement of the pipe down the skid surface 21. The skid 13 is a radially extending plate, displaced an angle of 90° with respect to the skid 12 as explained above, and has a pipe supporting surface 26 which converges with respect to the axis of the shaft 8 from its end 27 to its end 28. Both of the ends 27 and 28 are positioned radially outwardly with respect to the mounting plates 15 and 16 so that a pipe supported on the skids 13 may gravitate axially without interference therefrom. The lower end 28 extends axially to a position beyond the plate 16 for depositing lengths of pipe in the threads of the rolls 9 in a manner to be described. The slope of the skid surfaces 21 and 26 is in the direction of the table to which the pipe is to be transferred.

The units 3 are mounted on the shafts 8 with their end plates 15 lying under the lowermost length of pipe P engaged with the stops 6 on the table 1 as best shown in Figures 2 and 3. In this manner, the inner ends 22 of the skid surfaces 21 engage and lift the lowermost length of the pipe P on the table 1 when the units 3 are rotated to the position shown in Figure 2. The length of the end plates 15 and 16 and the radial positions of the skid surfaces 21 are such that the lowermost length of pipe P is elevated above the stop 6 so that it may gravitate down the skid surfaces 21. Downward gravitational movement of the pipe P over the surfaces 21 is arrested when it strikes the portions 24 of the plates 16 where it is held as rotation of the units 3 continues. The rotation of the skids 21 by continued rotation of the units 3 from the position shown in Figure 2 lowers the length of the pipe P with respect to the table 1 until it engages with the surface 26 of the skid 13 which in the meantime has been moving upwardly by the continued rotation of the units 3. As the skids 13 move upwardly to the position shown in Figure 3, the length of pipe P now supported on their skid surfaces 26 will have been moved upwardly over the edges of the end plates 16 so that it may gravitate down the surfaces 26. Recalling that the ends 28 of the surfaces 26 extend beyond the plates 16, it will be apparent that the pipe is free to roll onto screw conveyor rolls 9. The radial location of the skids 13 is such that their inner ends 28 are positioned just at the edges of the first threaded recesses 29, as shown in Figure 3, so that the pipe may roll into such recesses without jar or impact.

The manner in which a length of pipe P is handled by the skids 12 and 13 in being transferred from the table 1 will be better understood by considering the showings of Figures 10 through 14. These figures illustrate in a sequential manner the operation of the units 3 as they are rotated in a clockwise direction as indicated by the arrow. As each unit 3 moves to the position shown in Figure 10, its skid 12 makes initial contact with a length of pipe P supported on the table 1 against the stops 6. As the units 3 rotate to the positions shown in Figure 11 with the skids 12 at the top of their path of movement, the pipe is elevated by the skids 12 a distance sufficient to clear the stops 6 so that it may roll down their skid surfaces 21. Figure 12 shows the position of the pipe P after a further rotation of the units 3 and in which it has rolled down the skid surfaces 21 and has had its gravitational movement arrested by the end plates 16. Figure 13 shows the angular position of the units 3 in which the skids 13 make initial contact with the pipe preliminary to its being supported entirely by the skids 13 and, in this position, it will be noted that the portion 24 of each end plate 16 is still effective as a stop in preventing further gravitational movement of the pipe downwardly over the skids 13. Continued rotation of the units 3 to the position shown in Figure 14 effects a downward movement of the stop portions 24 and an upward movement of the skids 13 to impart a slight upward movement to the pipe so that it may roll downwardly over the skids 13 without interference from the end plates 16. Freeing the pipe P for final gravitational movement downwardly over the skids 13 results in its being dropped in the first threaded recess 29 as explained above.

While Figures 10 through 14 show only a single transfer unit 3, it will be appreciated that the length of pipe P is supported by at least a pair of such units which are rotated synchronously by the gear drive 11 with the parts of the respective units occupying identical angular positions relative to their mounting shafts 8.

In the embodiment of the invention described above, each revolution of the units 3 is effective to deliver a length of pipe P to the rolls 9. If it is desired to employ rolls 9 having a double thread (not shown), a pipe P should be delivered at every half revolution of the shafts 8. This condition would be answered by a unit 30 constructed, as shown in Figures 7 through 9, which have end plates mounting skids 12 and 13 constructed and arranged as described above in connection with the unit 3. The delivery of the second section of pipe P by the unit 30 is effected by a second set of skids 12a and 13a displaced 180° with respect to the skids 12 and 13 but otherwise constructed and mounted in a similar manner.

Although the above description is specific to an arrangement of tables in which the pipe is lowered from a table 1 at a relatively higher elevation to a table 2 at a relatively lower elevation, it will be apparent that the transfer units of this invention may be modified to effect a transfer of pipe from a table of lower elevation to a table of higher elevation. A modification of this nature may be effected readily by reversing the arrangement of skids and the direction in which they slope so that the skid having the closest radial location with respect to the shaft 8 picks up a section of pipe from the lower table and transfers it to the other skid for movement thereover onto the receiving table at a higher elevation. A modified arrangement of this nature may be used for transferring galvanized pipe from the outgoing screw conveyor table of the above mentioned patent to its receiving conveyor table.

Bearing in mind that the screw conveyor rolls on the ingoing and outgoing tables described in the above mentioned patent are located at different levels and the conveyor tables associated therewith support the lengths of pipe in a horizontal position, it will be understood that this requires units 3 having end plates 15 and 16 of different lengths so that the skids 12 mounted thereby will move the pipe being transferred through different vertical distances to compensate for the differences in the levels of the ends of the tables between which the pipe is being transferred. Since the principles of operation of the units 3 in such case are identical to that described above, a specific illustration of such an arrangement in the drawings need not and has not been made.

Referring again to Figure 2, and recalling that the description of the location of the ends 22 of the skids 12 is specific to an arrangeemnt for lifting and removing a single pipe P, it will be apparent that two or more of the lowermost pipes P may be lifted by extending the skid surfaces 21 to the left a distance corresponding to the diameters of the number of additional pipes to be removed. A similar result may be effected by providing skids 4 with ends terminating a further distance to the right as viewed in Figure 2 and, in such case, the number of pipes to be lifted may be regulated by adjusting the positions of the stops 6.

While one embodiment of our invention has been shown and described it will be apparent that other adaptations and modifications may be made without departing from the scope of the following claims.

We claim:

1. In an apparatus for transferring elongated articles such as pipe and the like between a pair of laterally spaced tables, the combination with said tables, of a transfer mechanism arranged between said tables, said transfer mechanism comprising a first skid for lifting an article from one of said tables and a second skid for receiving the article from said first skid and delivering it to the other of said tables, a support on which said skids are respectively mounted in circumferentially spaced positions for rotation about a common axis extending transversely of the space between said tables, each of said skids having a skid surface which converges relative to said axis in the direction of article transfer, and a stop for arresting movement of an article over the skid surface on said first skid.

2. An apparatus as defined in claim 1 characterized by said skids being mounted on said support in positions respectively spaced from said axis at relatively different radial distances.

3. An apparatus as defined in claim 1 characterized by said stop having an axial location between adjacent edges of said tables, and said second skid surface extending from a point having an axial location between said stop and the edge of said one table to a point beyond the edge of said other table.

4. In an apparatus for transferring elongated articles such as pipe and the like between a pair of laterally spaced tables, the combination with said tables, of a transfer mechanism arranged between said tables, said transfer mechanism comprising a pair of skids, means mounting said skids for rotation about a common axis extending transversely of the space between said tables and in angularly displaced positions relative thereto, each of said skids having a skid surface which converges relative to said axis in the direction of article transfer, the axial outer ends of said skid surfaces being respectively positioned outwardly of the adjacent edges of said tables and having inner ends which overlap each other in a direction axially of said axis, and a stop at the inner end of said first skid.

5. A transfer apparatus comprising a rotatable support, a pair of skids respectively having skid surfaces which extend axially and converge in a common direction relative to the axis of rotation of said support, said skid surfaces having inner ends which overlap each other relative to said axis, means mounting said skids on said support for rotation therewith and in circumferentially spaced positions relative to each other, and a stop at the one of said skid surface inner ends which is closer to said axis than its outer end.

References Cited in the file of this patent
UNITED STATES PATENTS

| | | |
|---|---|---|
| 921,165 | Ross | May 11, 1909 |
| 2,043,556 | Protin | June 9, 1936 |